US 11,519,437 B2

(12) United States Patent
Binkert

(10) Patent No.: US 11,519,437 B2
(45) Date of Patent: Dec. 6, 2022

(54) CLIP FOR FASTENING A FIRST ELEMENT TO A SECOND ELEMENT AND DEVICE WITH A CLIP OF THIS KIND

(71) Applicant: A. RAYMOND ET CIE, Grenoble (FR)

(72) Inventor: Sven Binkert, Lörrach (DE)

(73) Assignee: A. RAYMOND ET CIE, Grenoble (FR)

( * ) Notice: Subject to any disclaimer, the term of this patent is extended or adjusted under 35 U.S.C. 154(b) by 431 days.

(21) Appl. No.: 16/617,974

(22) PCT Filed: May 25, 2018

(86) PCT No.: PCT/EP2018/063773
§ 371 (c)(1),
(2) Date: Nov. 27, 2019

(87) PCT Pub. No.: WO2018/219799
PCT Pub. Date: Dec. 6, 2018

(65) Prior Publication Data
US 2020/0166061 A1    May 28, 2020

(30) Foreign Application Priority Data

May 29, 2017   (DE) ..................... 10 2017 005 352.9

(51) Int. Cl.
  *F16B 2/24*    (2006.01)
  *F16B 21/08*   (2006.01)
  (Continued)

(52) U.S. Cl.
  CPC ............ *F16B 2/243* (2013.01); *F16B 5/0642* (2013.01); *F16B 5/125* (2013.01); *F16B 21/086* (2013.01)

(58) Field of Classification Search
  CPC .......... F16B 2/243; F16B 2/20; F16B 5/0642; F16B 5/125; F16B 5/12; F16B 21/086; F16B 21/076
  See application file for complete search history.

(56) References Cited

U.S. PATENT DOCUMENTS 9,341,204 B2 *  5/2016  Fischer .................... F16B 2/22
2011/0314646 A1  12/2011  Ribes
(Continued)

FOREIGN PATENT DOCUMENTS

CN    102341605 A    1/2012
CN    103547814 A    1/2014
(Continued)

OTHER PUBLICATIONS

English translation of International Search Report for PCT/EP2018/063773 dated Sep. 12, 2018, 2 pages.
(Continued)

*Primary Examiner* — Robert Sandy
*Assistant Examiner* — Rowland Do
(74) *Attorney, Agent, or Firm* — Warner Norcross + Judd LLP

(57) ABSTRACT

Disclosed is a clip for fastening a first element to a second element, wherein the clip has a head, a tip, a first clip side, and a second clip side. The first clip side extends from the head along a longitudinal axis in the direction of the tip, and the second clip side extends from the head along the longitudinal axis in the direction of the tip and has a clip surface protruding from the first clip side. The clip surface can be moved, under the tension of a spring, from a first position into a position located closer to the longitudinal axis than the first position. The head surface merges into a first side wall via a first bending section which is bent around a (Continued)

first bending axis, wherein the first bending axis is at an angle of >0° to <180° to the longitudinal axis.

12 Claims, 6 Drawing Sheets

(51) Int. Cl.
  *F16B 5/06* (2006.01)
  *F16B 5/12* (2006.01)

(56) References Cited

U.S. PATENT DOCUMENTS

| | | |
|---|---|---|
| 2012/0301218 A1 | 11/2012 | De Jong et al. |
| 2013/0302087 A1 | 11/2013 | Binkert |
| 2014/0109357 A1 | 4/2014 | Fischer |
| 2015/0300388 A1 | 10/2015 | Maschat et al. |
| 2018/0163756 A1 | 6/2018 | Schulz et al. |
| 2018/0209454 A1 | 7/2018 | Binkert |
| 2020/0166061 A1 | 5/2020 | Binkert |

FOREIGN PATENT DOCUMENTS

| | | |
|---|---|---|
| CN | 209309062 U | 8/2019 |
| DE | 202010004995 U1 | 9/2011 |
| DE | 102011100235 A1 | 11/2012 |
| DE | 102015009366 A1 | 1/2017 |
| DE | 102015014430 A1 | 5/2017 |
| DE | 102015120331 A1 | 5/2017 |
| EP | 1787031 A1 | 5/2007 |
| EP | 2536958 B1 | 11/2015 |
| WO | 2012104250 A1 | 8/2012 |
| WO | 2015162365 A1 | 10/2015 |
| WO | 2016114856 A1 | 7/2016 |
| WO | 2016192840 A1 | 12/2016 |
| WO | 2017016651 A1 | 2/2017 |
| WO | 2017089055 A1 | 6/2017 |

OTHER PUBLICATIONS

Machine assisted English translation of EP1787031A1 obtained from https://patents.google.com on Nov. 26, 2019, 11 pages.
Machine assisted English translation of DE202010004995U1 obtained from https://patents.google.com on Nov. 26, 2019, 6 pages.
Machine assisted English translation of DE102015014430A1 obtained from https://patents.google.com/patent on Jul. 21, 2021, 7 pages.

* cited by examiner

CLIP FOR FASTENING A FIRST ELEMENT TO A SECOND ELEMENT AND DEVICE WITH A CLIP OF THIS KIND

CROSS-REFERENCE TO RELATED APPLICATIONS

This application is the National Stage of International Application No. PCT/EP2018/063773, filed on 25 May 2018, which claims priority to and all advantages of German Patent Application No. 102017005352.9, filed on 29 May 2017, the content of which is hereby incorporated by reference.

FIELD OF THE INVENTION

The invention generally relates to a clip for fastening a first element to a second element. The invention further relates to a device having a first element and a second element attached to the first element, wherein the first element has a recess, and the second element is attached to the first element via a clip.

BACKGROUND OF THE INVENTION

A clip for fastening a first element to a second element is known from EP 2 536 958 B1. The clip has a head and a tip. The clip described therein has a first clip side (described therein with outer leg section 8) and a second clip side opposite the first clip side. The first and second sides each extend from a bending section on the head to the tip formed by the vertices of the two arc-shaped bending sections. The bending sections are followed by intermediate sections, at the ends of which two clip surfaces (contact sections 15) per intermediate section are provided for contact with the first element. Two clip surfaces overlap on the first clip side; two clip surfaces overlap on the second clip side.

The clip known from WO 2012/104250 A2 has a comparable basic structure. In addition, side walls in the form of edge wings are provided which extend from one clip side in the direction of the other clip side. In WO 2012/104250 A2, a support arm is also disclosed; this merges into the first clip side via a bending section and, in a plan view, extends perpendicularly to the first clip side along the longitudinal axis of the clip.

BRIEF SUMMARY OF THE INVENTION

Disclosed is a clip for fastening a first element to a second element. The clip comprises a head and a tip. The clip also comprises a first clip side and a second clip side, wherein the first clip side extends from an area adjacent to the head along a longitudinal axis in the direction of the tip, and the second clip side extends from an area adjacent to the head along the longitudinal axis in the direction of the tip. The clip includes a clip surface protruding beyond the first clip side, wherein the clip surface can be moved, under the tension of a spring, from a first position along a direction of movement into a position located closer to the longitudinal axis in comparison to the first position, wherein the direction of movement has at least one component that is perpendicular to the longitudinal axis. The head has a head section presenting a head surface pointing away from the tip, wherein the head surface merges into a first side wall via a first bending section which is bent around a first bending axis, wherein the first bending axis is at an angle of $>0°$ to $<180°$ to the longitudinal axis and/or at an angle of $0°$ to $<90°$ to the component of the direction of movement of the clip surface that is perpendicular to the longitudinal axis. The first side wall merges into the first clip side via a second bending section which is bent around a second bending axis, wherein the second bending axis is at an angle of $>0°$ to $<180°$ to the component of the direction of movement of the clip surface that is perpendicular to the longitudinal axis and/or is at an angle of $0°$ to $<90°$ to the longitudinal axis.

The clip makes it possible to draw the clip surface under the part of the head that protrudes over the shaft of the clip connecting the head to the tip. This arrangement also has the advantage that, particularly when a first component is thin, such as if it comprises the fabric of an airbag to be attached to a frame (second component) of a vehicle, especially if the thin edge of the fabric is to be clamped or if a hole is defined in the thin edge of the fabric through which the shaft of the clip is passed, the proposed orientation of the head relative to the clip surfaces can better prevent the fabric from being pulled over the head.

BRIEF DESCRIPTION OF THE DRAWINGS

The invention is described in greater detail below with reference to the accompanying Figures, in which.

DETAILED DESCRIPTION

Figure 1:
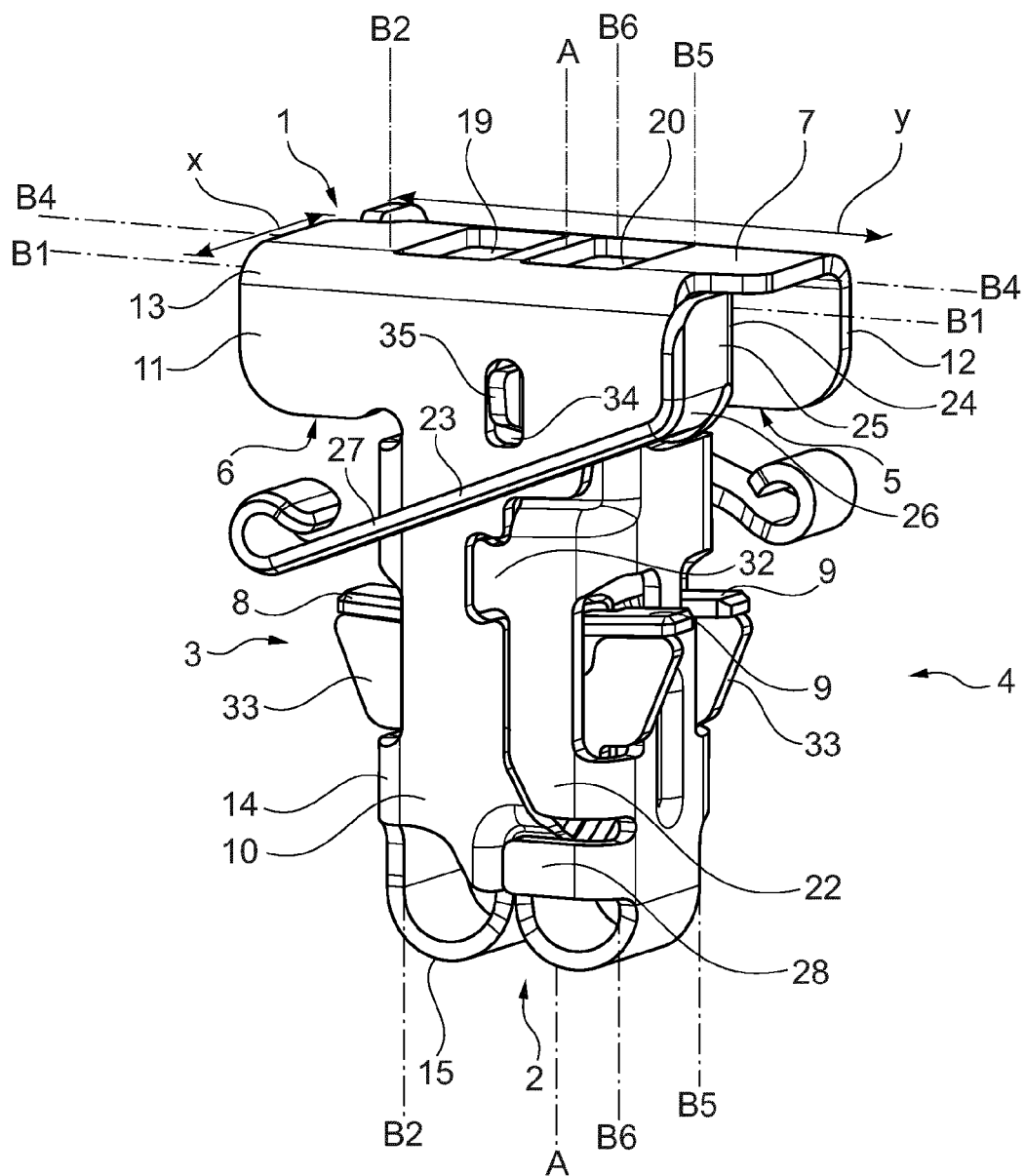
FIG. 1 shows a perspective side view obliquely from above of one embodiment of the clip according to the invention.

A clip for fastening a first element to a second element is understood to mean a fastening device that has at least one first contact surface (in certain embodiments the counter surface described below) and at least one second contact surface facing the first contact surface. The first contact surface is usually provided on a fixed element of the fastening device, while the second contact surface (i.e., the clip surface) is provided on a resilient element of the fastening device. Such fastening devices are provided to be inserted by a tip into a recess, usually a hole, in the first element. In doing so, the resilient element bearing the second contact surface is pressed in during insertion, but springs back to its initial position after passing through the hole. The first element is usually designed as a flat element, for example as a plate or sheet of a part of a frame of a vehicle. However, the first element may also have a blind hole with a correspondingly selected undercut that allows the resilient element to spring out after it has passed a narrower part of the hole above the undercut. The second element can be fixed to the first element via clamping, for example if it is pushed between a head of the clip and a surface of the first element, and the distance of the first contact surface, which is then provided at the head of the clip, and the second contact surface of the clip is selected so that it can produce such clamping at a certain material thickness of the first element and a certain material thickness of the second element. In certain embodiments, the second element also defines a hole, and the clip with its tip is guided through both holes. In some embodiments, the second element is attached to a head of the clip, for example if it has a hook or a fastening mushroom, or if the second element is simply glued, welded or otherwise joined to the head of the clip.

A head of such a clip is understood to mean a widening provided at one end of the clip. The head is usually provided to prevent the clip from being disposed completely through a hole in the first element. Frequently, the head is also formed to apply the force to be applied to insert the clip into a hole in the first element to the clip. For this purpose, the clip frequently has a flat surface (the head surface) facing away from the tip. In a certain embodiment, the head is formed rigid, wherein "rigid" is understood to mean that no section of the head is movable relative to another section of the head; that is, it is resilient. However, the (rigid) head may be provided with resilient elements such as spring arms or umbrella-like sealing lips. In certain embodiments, the largest cross-sectional area of all cross-sectional areas of the head in planes perpendicular to the longitudinal axis of the clip is greater than the largest cross-sectional area of all cross-sectional areas of the shaft in planes perpendicular to the longitudinal axis of the clip.

The clip also has a tip. In the context of this description, "tip" refers only to the end of the clip opposite the head. Some embodiments provide that a shaft of the clip extending from the head in the direction of the tip tapers in the direction of the tip. However, this is not absolutely necessary. A tip in the context of this description is also understood to be a blunt end to be provided in a conceivable embodiment at the end of a shaft opposite the head. However, in certain embodiments, the tip is formed from several partial sections of the clip, for example by four vertices of arc-shaped bent sections, or two vertices of arc-shaped sections.

Between the head and the tip, the clip has a shaft, optionally comprising a plurality of parts. The clip has a longitudinal axis that extends from the head to the tip. In particular embodiments, the shaft is longer with respect to its longitudinal extension pointing from head to tip than the maximum width of the shaft perpendicular to the longitudinal axis. In some embodiments, the longitudinal axis of the clip points in the direction of the longitudinal extension of the shaft. In certain embodiments, the shaft and the clip are designed mirror-symmetrical in relation to a plane containing the longitudinal axis of the clip. In an alternative embodiment, the shaft, the clip, is designed to be rotationally symmetrical in such a manner that there is at least one plane containing the longitudinal axis of the clip, with which each section of the shaft is located on one side of such plane, can be brought into alignment with an identically formed section of the shaft, or of the clip, on the other side of such plane, by a 180° rotation around the longitudinal axis. The aforementioned symmetry rules with respect to the shaft relate to the design of the clip side, the clip surface, the side walls and the mating walls (if present) and do not rule out additional elements, not designed to follow the symmetry rule, such as fingers or locking projections, being provided on the shaft.

The clip has a first clip side that extends from an area adjacent to the head in the direction of the tip. The clip also has a second clip side that extends from an area adjacent to the head in the direction of the tip. The first clip side and the second clip side form elements of the shaft of the clip. In some embodiments, the first clip side is arranged on one side of the plane with respect to a plane containing the longitudinal axis, and the second clip side is arranged on the opposite side of such plane. In certain embodiments, the first clip side runs parallel to the second clip side.

The first clip side extends from an area adjacent to the head along the longitudinal axis in the direction of the tip of the clip. In this case, the first clip side does not have a curved transition section, such as a bending section, with which it merges directly into a component that forms a part of the head of the clip. With the clip according to the invention, the first side wall is inserted between the first clip side and the head surface.

In certain embodiments, the first clip side has a recess. The element on which is formed the clip surface protruding on the first clip side typically passes through such recesses. In some embodiments, it is therefore the task of the clip side to form an enclosure for a recess through which the element bearing the clip surface can extend. This task can also be performed by the first clip side if the first clip side starts at some distance from the head; that is, the edge of the clip side next to the head is a few millimeters, for example more than 2, for example more than 5 millimeters away from an element belonging to the head. In particular embodiments, it may be the task of the first clip side to contribute to the stability of the shaft of the clip. This goal is achieved particularly well if the edge of the first clip side closest to the head is brought as close as possible to the head and is arranged, for example, only a few millimeters or even only one millimeter away from the head.

In certain embodiments, the first clip side has a rectangular basic structure, into which the recess is worked for the element bearing the clip surface to pass through. In addition, one or more bulges can be provided on the clip surface to further stabilize the shaft.

In some embodiments, the second clip surface is designed like the first clip surface. In a particular embodiment, the second clip surface is designed to be rotationally symmetrical to the first clip surface in such a manner that there is at least one plane containing the longitudinal axis of the clip, with which each section of the first clip surface of the clip located on one side of such plane can be brought into alignment with a section of the second clip surface of the clip on the other side of such plane by a 180° rotation around the longitudinal axis.

On the first side of the clip, a clip surface protrudes. In certain embodiments, the clip surface faces away from the tip and in particular faces the head. In some embodiments, the clip surface is in a first position in a plane that is perpendicular to the longitudinal axis of the clip. However, there are also embodiments in which the clip surface is arranged in a first position in a plane that is at an angle to the longitudinal axis of the clip. In some embodiments, the angle is >45°, alternatively >50°, alternatively >60°, alternatively >70° to the longitudinal axis of the clip. In particular embodiments, the first position is the position in which the clip surface is located, if no external force is applied to the clip.

The clip according to the invention is designed in such a manner that the clip surface can be moved, under the tension of a spring, from a first position along a direction of movement to a position closer to the longitudinal axis in comparison to the first position. The element bearing the clip surface can thus be pressed in the direction of the longitudinal axis. In this case, it is provided that the direction of movement along which the clip surface can be moved from the first position closer to the longitudinal axis has at least one component that is perpendicular to the longitudinal axis.

There are some embodiments in which the clip surface can be moved from the first position under tension of a spring to a position closer to the longitudinal axis along a direction of movement perpendicular to the longitudinal axis. However, there are also certain embodiments in which the direction of movement is arc-shaped, for example embodiments in which the clip surface is formed at the end of an intermediate section that extends away from a bending section belonging to the tip and, when the clip surface is pressed in, a rotational movement of the clip surface around the apex of the bending section is set. However, even when the direction of movement is arc-shaped, there is always a component alongside the movement arc, which is perpendicular to the longitudinal axis.

The head of the clip according to the invention has a head section on which a head surface pointing away from the tip is formed. In certain embodiments, the head surface is designed flat. The head surface may have holes or recesses at the edge side. These are frequently provided in the head surface if tools, such as pliers, are to be guided from the outside through the head surface into the interior of the clip, for example to, when removing the clip, move the clip surfaces from the first position to the position closer to the longitudinal axis under the tension of a spring. In some embodiments, the longitudinal axis passes through the center of the head. However, in some embodiments the longitudinal axis passes off-center through the head.

In certain embodiments, the head surface is the largest, in particular embodiments, the only surface of the head pointing away from the tip. In some embodiments, the head surface is arranged in a plane that is at an angle of >45°, alternatively >50°, alternatively >60°, alternatively >80°, alternatively >85° to the longitudinal axis. In some embodiments, the head surface is arranged in a plane that is perpendicular to the longitudinal axis. In specific embodiments, the head surface forms the last element of the clip in relation to the extension of the clip from the tip onward.

Relating to the clip according to the invention, the head surface merges into a first side wall via a first bending section, which is bent around a first bending axis, wherein the first bending axis is at an angle of >0° to <180° to the longitudinal axis and/or at an angle of 0° to <90° to the component of the direction of movement of the clip surface that is perpendicular to the longitudinal axis.

In the context of this description, this reference that a first axis, for example a bending axis, is at an angle to a second axis, for example the longitudinal axis or another bending axis, includes both the designs in which the first axis intersects the second axis, and the described angle can thus be ascertained at the point of intersection of the two axes. However, said reference also includes, in particular, designs in which the first axis lies in a first plane and the second axis lies in a second plane that is parallel to the first plane, and the angle formed between the axes is determined by parallel displacement of one plane to the other plane at the point of intersection that then arises of the one axis with the second axis that is displaced in parallel.

In certain embodiments, the first bending axis is at an angle of >30° to <150° and alternatively from >45° to <135°, and alternatively from >60° to <120°, and alternatively from >80° to <100°, and alternatively at an angle of 90° to the longitudinal axis of the clip. In particular embodiments, the first bending axis is at an angle of <90°, alternatively of <45°, alternatively of <30°, alternatively of <20°, alternatively of <10°, and alternatively at an angle of 0° to the component of the direction of movement of the clip surface that is perpendicular to the longitudinal axis.

In particular embodiments, the angle enclosed between the head surface and the first side wall is >30° to <150°, and alternatively from >45° to <135°, and alternatively from >60° to <120°, and alternatively from >80° to <100°, and alternatively 90°.

With the clip according to the invention, it is provided that the first side wall merges into the first clip side via a second bending section, which is bent around a second bending axis, wherein the second bending axis is at an angle of >0° to <180° to the component of the direction of movement of the clip surface that is perpendicular to the longitudinal axis and/or at an angle of 0° to <90° to the longitudinal axis.

In some embodiments, the second bending axis is at an angle of >30° to <150°, and alternatively >45° to <135°, and alternatively of >60° to <120°, and alternatively of >80° to <100°, and alternatively at an angle of 90° to the component of the direction of movement of the clip surface that is perpendicular to the longitudinal axis. In particular embodiments, the second bending axis is at an angle of <90°, alternatively of <45°, alternatively of <30°, alternatively of <20°, alternatively of <10°, and alternatively at an angle of 0° to the longitudinal axis.

In a particular embodiment, the angle enclosed between the first side wall and the first clip side is >30° to <150°, and alternatively from >45° to <135°, and alternatively from >60° to <120°, and alternatively from >80° to <100°, and alternatively 90°.

In certain embodiments, the head has at least one counter surface facing the tip, which opposes the clip surface. In specific embodiments, the first clip side is formed flat and has an outer surface that lies in a plane, wherein, in such embodiments, the parts of the clip surface that protrude beyond the first clip side in the first position and the counter surface of the head facing the clip surface lie on the same side of such plane. In particular embodiments, there is a surface normal of the clip surface in the first position, which surface normal intersects the counter surface of the head facing the tip. In some embodiments, the clip surface in the first position overlaps the counter surface at least partially when viewed in a direction along the longitudinal axis of the clip.

In some embodiments, the head of the clip has a counter surface that faces the clip surface. In certain embodiments, the clip surface runs parallel to the counter surface if the resilient element is in its initial position; that is, it springs outwards. In specific embodiment, the angle enclosed between the clip surface and the counter surface is <45°, alternatively <30°, alternatively <20°, alternatively <10° when the resilient element is in its initial position; that is, it springs outwards. In specific embodiments, the counter surface is formed on a fixed area of the head. In some embodiments, the head has resilient arms which can spring in a direction parallel to the longitudinal direction of the clip, wherein the counter surface is provided at a section of the arm, in particular embodiments, at an end section of the arm.

In particular embodiments, the first clip side merges into a counter wall opposite the first side wall via a third bending section, which is bent around a third bending axis. In specific embodiments, the third bending axis runs parallel to the second bending axis. In some embodiments, the first side wall, the first clip side adjacent to the first side wall, and the counter wall adjacent to the first clip side and opposite the first side wall have a U-shaped cross-section together in a cross-section perpendicular to the longitudinal axis, wherein the first clip side forms the base of the U.

In certain embodiments, the third bending axis is at an angle of >30° to <150°, and alternatively from >45° to <135°, alternatively from >60° to <120°, alternatively from >80° to <100 alternatively at an angle of 90° to the component of the direction of movement of the clip surface that is perpendicular to the longitudinal axis. In some embodiments, the third bending axis is at an angle of <90°, alternatively of <45°, alternatively of <30°, alternatively of <20°, alternatively of <10° and alternatively at an angle of 0° to the longitudinal axis.

In particular embodiments, the angle enclosed between the first side wall and the counter wall opposite the side wall is <45°, alternatively <40°, alternatively <30°, alternatively <20°, alternatively <10°. In certain embodiments, the counter wall opposite the first side wall runs parallel to the first side wall.

In some embodiments, the head has a maximum longitudinal extension in a direction perpendicular to the longitudinal axis and a maximum transverse extension in a direction perpendicular to the longitudinal axis, which is also perpendicular to the direction of the longitudinal extension, such that, in a plan view of the head along the longitudinal axis, all parts of the head lie within a rectangular head boundary surface that is perpendicular to the longitudinal axis, the longer side of which extends in the direction of the maximum longitudinal extension and has its length, and the shorter side of which extends in the direction of the maximum transverse extension and has its length. In certain embodiments, the projection of the clip surface in the direction of the longitudinal axis lies on the plane of the head boundary surface in the head boundary surface. If the head has resilient arms protruding from the head, these may also project from the head boundary surface and, in some embodiments, are not taken into account for determining the head boundary surface.

In particular embodiments, the maximum longitudinal extension corresponds to the maximum transverse extension. Thus, the head boundary surface can be square. In some embodiments, the maximum longitudinal extension is greater than the maximum transverse extension. In specific embodiments, the maximum longitudinal extension corresponds to 1.2 times, alternatively 1.5 times, and alternatively more than 1.5 times, and alternatively 2 times, alternatively more than 2 times, the maximum transverse extension.

In some embodiments, the shape of an envelope corresponds to the head boundary surface of the shape of the envelope of the head surface.

In certain embodiments, the direction of the maximum longitudinal extension of the head and the component of the direction of movement of the clip surface perpendicular to the longitudinal axis are parallel to each other.

In specific embodiments, the first side wall extends from the first clip side in the direction of the second clip side. In some embodiments, a second side wall is provided, which extends from the second clip side in the direction of the first clip side. In certain embodiments, the first side wall has a flat outer surface that forms a part of the outer surface of the shaft. In particular embodiments, the second side wall has a flat outer surface that forms a part of the outer surface of the shaft.

In some embodiments, the head surface merges into a second side wall via a fourth bending section, which is bent around a fourth bending axis, wherein the fourth bending axis is at an angle of >0° to <180° to the longitudinal axis and at an angle of 0° to <90° to the component of the direction of movement of the clip surface that is perpendicular to the longitudinal axis and extends parallel to the first bending axis or is the first bending axis. In such embodiments, the second side wall merges into the second clip side via a fifth bending section, which is bent around a fifth bending axis, wherein the fifth bending axis is at an angle of >0° to <180° to the component of the direction of movement of the clip surface that is perpendicular to the longitudinal axis and/or at an angle of 0° to <90° to the longitudinal axis and runs parallel to the second bending axis. In certain embodiments, the second clip side merges into a second counter wall opposite the second side wall via a sixth bending section, which is bent around a sixth bending axis. In some embodiments, the sixth bending axis runs parallel to the fifth bending axis. In certain embodiments, the second side wall, the second clip side adjacent to the second side wall and the second counter wall adjacent to the second clip side and opposite the second side wall have a U-shaped cross-section together in a cross-section perpendicular to the longitudinal axis, wherein the second clip side forms the base of the U.

In specific embodiments, in particular in embodiments that are mirror-symmetrical with respect to a plane containing the longitudinal axis and extending parallel to the first clip side and the second clip side, the first side wall and the second side wall of the second clip side are aligned flush. Alignment is understood to mean that the first side wall has an outwardly pointing surface and the second side wall has an outwardly pointing surface, and that the outwardly pointing surface of the first side wall and the outwardly pointing surface of the second side wall are arranged essentially in one plane. In some embodiments, the first side wall and the second side wall are arranged on the same side of a plane containing the longitudinal axis of the clip.

In certain embodiments, in particular in an embodiment that is designed to be rotationally symmetrical in such a manner that there is at least one plane containing the longitudinal axis of the clip, with which each section of the clip located on one side of such plane can be brought into alignment with an identically formed section of the clip on the other side of such plane by a 180° rotation around the longitudinal axis, the second counter wall and the first side wall are aligned flush. Alignment is understood to mean that the first side wall has an outwardly pointing surface and the second counter wall has an outwardly pointing surface, and that the outwardly pointing surface of the first side wall and the outwardly pointing surface of the second counter wall are arranged essentially in one plane. In some embodiments, the first side wall and the second counter wall are arranged on the same side of a plane containing the longitudinal axis of the clip.

In the description, the interior of the clip is defined as the immediate area around the longitudinal axis of the clip and/or the area enclosed by the first clip side, the second clip side and the first side wall and the second side wall and, if present, the area enclosed by the first counter wall and the second counter wall. To the extent that this description refers to outwardly pointing surfaces or uses the term "outwardly" in any other manner, it means a direction that points away from the longitudinal axis of the clip.

In some embodiments, several clip surfaces can protrude beyond the first clip side, which are provided for contact with the first and/or the second element to be fastened. Furthermore, it is conceivable that each of these clip surfaces can move along the direction of movement independently of the others. In specific embodiments, such clip surfaces have a partially mechanical coupling, in particular via more or less elastically designed connections.

In certain embodiments, several clip surfaces can protrude beyond the second clip side, which are provided for contact with the first and/or the second element to be fastened.

Furthermore, each of these clip surfaces can move along the direction of movement independently of the others. In some embodiments, such clip surfaces have a partially mechanical coupling, in particular via more or less elastically designed connections.

In particular embodiments, four clip surfaces are provided, two projecting from the first clip side and two projecting from the second clip side, each spaced from the head and facing the head, and each provided on a resilient element.

In specific embodiments, the second bending section, with which the first side wall merges into the first clip side, is interrupted by a recess. In some embodiments, a pre-tensioned element of the clip springing in the direction of the outside, on which the clip surface is formed, extends from the inside through the recess to the outside. In this case, a pre-tensioning to the outside is also understood to mean an embodiment with which the pre-tensioned element has a rest position at which it projects from a partial area of the shaft, for example a clip side of the shaft, and from which it can be moved under the action of force, particularly in a direction perpendicular to the shaft axis (longitudinal axis), or in a direction parallel to a perpendicular to the shaft axis (longitudinal axis). Particularly, the pre-tensioned element is connected to a resilient element or part of a resilient element, such that it must be moved from the rest position under the action of force against an increasing spring force, and the spring force causes the projection to return to its rest position after the action of force has ceased. In certain embodiments, the rest position is the position at which the resilient element exerts no force. The rest position may or may not be defined by a stop against which the resilient element presses or pulls the pre-tensioned element. In some embodiments, the fifth bending section, with which the second side wall merges into the second clip side, is also interrupted by a recess. In particular embodiments, a pre-tensioned element of the clip springing in the direction of the outside, on which the clip surface is designed, extends from the inside through the recess to the outside.

In some embodiments, the first side wall, the first clip surface, the first counter wall, the second side wall, the second clip surface and/or the second counter wall have a flat base body. A flat base body is understood to mean a base body that has a flat outer surface, particularly arranged in one plane. In certain embodiments, the flat base body additionally has a uniform height (thickness). It is conceivable that a flat base body, designated here as flat, has bulges, for example small knobs or guide ribs, or indentations or dents. Even such a base body with deliberately selected, singular deviations from the purely geometrically flat form is understood to be a flat base body during the present description.

In certain embodiments, the first side wall has a flat base body, wherein a narrow side of the base body faces the first side wall of the second side wall, wherein the second side wall (in particular in the case of a mirror-symmetrical design) or the second counter wall (in particular in the case of a rotationally symmetrical design) has a flat base body, wherein a narrow side of the base body faces the second side wall, or the second counter wall faces the first side wall. In some embodiments, the narrow side of the base body extends at right angles to an outwardly pointing surface of the base body. In such embodiments, the narrow side of the first side wall and/or the narrow side of the second side wall or second counter wall is formed at least partially flat. In specific embodiments, the narrow side of the first side wall extends in a plane that runs parallel to the longitudinal axis or contains the longitudinal axis of the clip, and/or the narrow side of the second side wall or second counter wall extends in a plane that runs parallel to the longitudinal axis or contains the longitudinal axis of the clip.

In some embodiments, the first clip side merges into an intermediate section via a bending section. The bending section is provided as an arc at one end of the first clip side, wherein the vertex of the arc at the end of the first clip side forms a part of the tip of the clip. In certain embodiments, the second clip side merges into an intermediate section via a bending section. The bending section is provided as an arc at one end of the second clip side, wherein the vertex of the arc at the end of the second clip side forms a part of the tip of the clip. The arc can be designed starting from the clip side inwards. The arc can also be bent outwards.

In particular embodiments, a resilient element having the clip surface has a bevel. The bevel can be designed in such a manner that the bevel tapers in the direction of the tip. This makes it possible for the resilient element to come into contact with the edge that delimits the hole when the tip of the clip is inserted into a hole in an element, and to be pushed inwards by such edge against the spring pre-tensioning.

In certain embodiments, the head has a counter surface facing the tip of the clip and opposite the clip surface. In some embodiments, the counter surface is arranged on the underside of the head of the clip in a plan view of the head surface of the clip. In some embodiments, the counter surface comes into contact with the first and/or second element to be fastened, and represents a stop in a direction of movement parallel to the longitudinal direction of the clip. In particular embodiments, the counter surfaces are formed by the underside and/or edge of the area of the side wall that is associated with the head; that is, the section of the side wall that has a greater extension perpendicular to the longitudinal axis of the clip, for example the section that projects beyond the shaft and adjoins the head face via a first bending section. This aforementioned area is also designated the side surface of the head.

In some embodiments, the first side wall extends from the first clip side in the direction of the second clip side and a second side wall (in particular with a mirror-symmetrical design) or a second counter wall (in particular with a rotationally symmetrical design) extends from the second clip side in the direction of the first clip side, wherein the first side wall and/or the second side wall or the second counter wall, respectively, have outwardly pointing base surfaces lying in a base plane, wherein the base plane limits the extension of the shaft in the direction perpendicular to the base plane and, in particular embodiments, the extension of the clip in such direction, if applicable with the exception of spring-elastic arms provided at the head (in such direction, all the elements lie on the same side of the base plane).

In particular embodiments, the counter wall extends from the first clip side in the direction of the second clip side and a second counter wall (in particular with a mirror-symmetrical design) or a second side wall (in particular with a rotationally symmetrical design) extends from the second clip side in the direction of the first clip side, wherein the counter wall and/or the second counter wall or the second side wall, respectively, have outwardly pointing base surfaces lying in a base plane, wherein the base plane limits the extension of the shaft in the direction perpendicular to the base plane and, in certain embodiments, the extension of the clip in such direction, if applicable with the exception of spring-elastic arms provided at the head (in such direction, all the elements lie on the same side of the base plane).

In some embodiments, a part of the bending section forms a part of the tip. Particularly, the vertex of the bending section is spaced the furthest from the head surface.

In certain embodiments, the first clip side extends from the head to the tip, wherein the tip-side end of the first clip side is connected to sections of the clip that contribute to the formation of the tip. In particular embodiments, the second clip side extends from the head to the tip, wherein the tip-side end of the second clip side is connected to sections of the clip that contribute to the formation of the tip. However, designs are also conceivable in which the shaft of the clip starts from the head with a first clip side and a second clip side, each extending in the direction of the tip, but then, between the first clip side and the sections of the clip forming the tip, other sections of the clip are provided that point in other directions, in particular in relation to the extension of the first clip side, and/or then, between the second clip side of the clip and the sections of the clip forming the tip, other sections of the clip are provided that point in other directions, in particular in relation to the extension of the second clip side.

In some embodiments, the first side wall merges into a support section via a seventh bending section, which is bent around a seventh bending axis, wherein the seventh bending axis is at an angle of >0° to <180° to the longitudinal axis and/or at an angle of 0° to <90° to the component of the direction of movement of the clip surface that is perpendicular to the longitudinal axis, and a counter surface facing the tip is formed on the support section.

Particularly, the support section is parallel to the clip surface, and/or parallel to the head surface, and/or perpendicular to the first side wall.

In certain embodiments, the clip has a resilient support arm connected to the head, wherein the support arm is arranged on the side of the head opposite the first side wall, but is connected to the first side wall via a bar connected to the first side wall.

In particular embodiments, the head, and the first clip side, and the first side wall, and the second clip side, and the second side wall are all part of a one-piece element created by bending sections of a metal section. In some embodiments, the clip is produced according to the invention from plastic, for example by injection molding.

The clip according to the invention is used particularly for fastening an element (the second element) to a body part (the first element) of a vehicle, particularly to the frame of a vehicle. In particular, the clip is used to attach a panel (second element) to the frame of a vehicle (first element). In some embodiments, the clip is used for attaching an airbag to a body part, particularly a frame of a vehicle.

The device according to the invention comprises a first element and a second element fixed to the first element, wherein the first element has a hole and the second element is fixed to the first element via a clip according to the invention, wherein the clip passes through the hole in such a manner that the head of the clip is arranged on one side of the first element and the tip of the clip is arranged on the opposite side of the element. In some embodiments, the clip passes through the hole in such a manner that the head of the clip is arranged on one side of the first element and a clip surface of the clip is arranged on the opposite side of the element. In some embodiments, the first element is a body part of a vehicle, typically a frame of a vehicle. In specific embodiments, the second element is a panel or an airbag.

The clip shown in the figures for attaching a first element to a second element has a head 1 and a tip 2. A shaft comprising several partial sections extends between the head 1 and the tip 2.

The shaft has a first clip side 3 and a second clip side 4 that is arranged opposite to the first clip side 3 in relation to a longitudinal axis A of the clip and runs parallel to the first clip side 3. Both the first clip side 3 and the second clip side 4 extend from the area of the head 1 in the direction of the tip 2. The first clip side 3 ends in an arc-shaped bending section 15, which is bent inwards starting from the first clip side 3. The vertex of the arc of the bending section 15 forms a part of the tip 2. The second clip side 4 also ends in an arc-shaped bending section, which is bent inwards. The vertex of the arc of the bending section forms a part of the tip 2 of the clip.

The head 1 has a maximum longitudinal extension X and a maximum transverse extension Y which form a rectangular basic shape. The head 1 has a side surface 11, at the lower edge of which the counter surface 6 facing the tip 2 is provided. At the lower edge of the side surface 12 opposite the side surface 11, the counter surface 5 facing the tip 2 is provided.

The clip has clip surfaces 8 that protrude on the first clip side 3. The clip also has clip surfaces 9, which protrude from the second clip surface 4. The clip surfaces 8, 9 face the head 1.

A first side wall 10 is connected to the head surface 7 via a first bending section 13 bent around a first bending axis B1; said side wall extends from the head 1 to the vicinity of the tip 2 and has a flat base body. The side surface 11 forms a part of the side wall 10, specifically the part of the side surface 11 belonging to the head 1. The first bending axis B1 runs perpendicular to the longitudinal axis A (this is determined by displacing the bending axis B1 in a parallel direction until it intersects the longitudinal axis A; the angle at the point of intersection of the bending axis B1 and the longitudinal axis A thus formed amounts to 90°). In the area of the head 1, the longitudinal extension of the side wall 10, specifically the side surface 11 forming part of the side wall 10, is similar in size to the longitudinal extension X of the head surface 7. The first clip side 3 is connected to the first side wall 10 via a second bending section 14 that is bent around a second bending axis B2. The second bending axis B2 runs parallel to the longitudinal axis A.

A second side wall (pointing backwards in FIG. 1), which extends from the head 1 into the vicinity of the tip 2 and has a flat basic body, adjoins the head surface 7 via a fourth bending section bent around a fourth bending axis B4. The fourth bending axis B4 runs perpendicular to the longitudinal axis A (this is determined by displacing the bending axis B4 in a parallel direction until it intersects the longitudinal axis A; the angle at the point of intersection of the bending axis B4 and the longitudinal axis A thus formed amounts to 90°). The first clip side 3 is connected to the second side wall via a fifth bending section, which is bent around a fifth bending axis B5. The fifth bending axis B5 runs parallel to the longitudinal axis A.

The first clip side 3 merges into a counter wall 17 opposite the first side wall 10 via a third bending section, which is bent around a third bending axis B3, wherein the third bending axis B3 runs parallel to the second bending axis B2. The second clip side 4 merges into a second counter wall opposite the second side wall via a sixth bending section, which is bent around a sixth bending axis B6, wherein the sixth bending axis B6 runs parallel to the fifth bending axis B5.

The first clip side 3 merges into an intermediate section 18 via the bending section 15. At the end of the intermediate section 18, the clip surface 8 is provided. In particular, the illustration in FIG. 2 shows that the bending section 15 acts as a kind of a spring. The clip surface 8 can be moved from the first position shown in FIG. 1 to a position closer to the longitudinal axis than the first position shown in FIG. 1 by applying a force to the outer end of the clip surface 8. Thereby, the spring formed by the bending section 15 is tensioned; specifically, the bending section 15 is bent up. If the force is reduced or the force falls way, the bending section 15 tensioned in such a manner causes the clip surface 8 to move back from the position closer to the longitudinal axis to the first position shown in FIG. 1.

Figure 2:
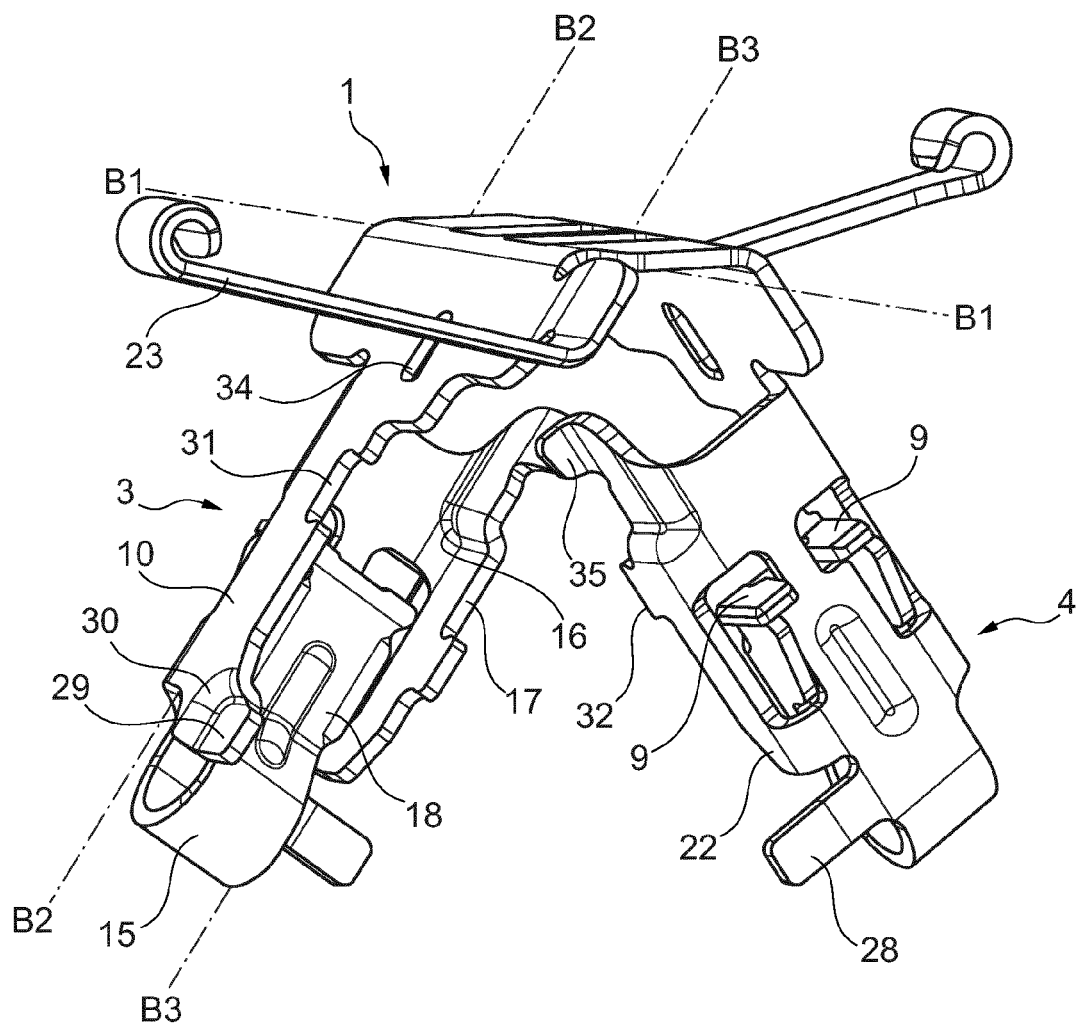
FIG. 2 shows a perspective view obliquely from above the clip according to the embodiment of FIG. 1 that is bent up.

When moving from the first position shown in FIG. 1 to a position closer to the longitudinal axis in comparison to the first position, the clip surface 8 moves approximately perpendicular to the longitudinal axis A. In fact, however, the clip surface 8 performs a movement along an arc around the vertex of the bending section 15. Thus, the clip surface 8 has a curved direction of movement upon its movement from the first position to the position closer to the longitudinal axis A. However, at each moment of motion, such surface has a component that is perpendicular to the longitudinal axis A. The head surface 7 pointing away from the tip 2 is designed flat. In its center, it has two recesses 19, 20. Such recesses 19, 20 are suitable for the insertion of tools that can be brought into engagement with the intermediate sections 18 in order to move the intermediate sections 18 inwards towards the longitudinal axis A. This makes it possible to move the clip surface 8 and the clip surface 9 to a position closer to the longitudinal axis A, and thus to remove the clip.

Figure 3:
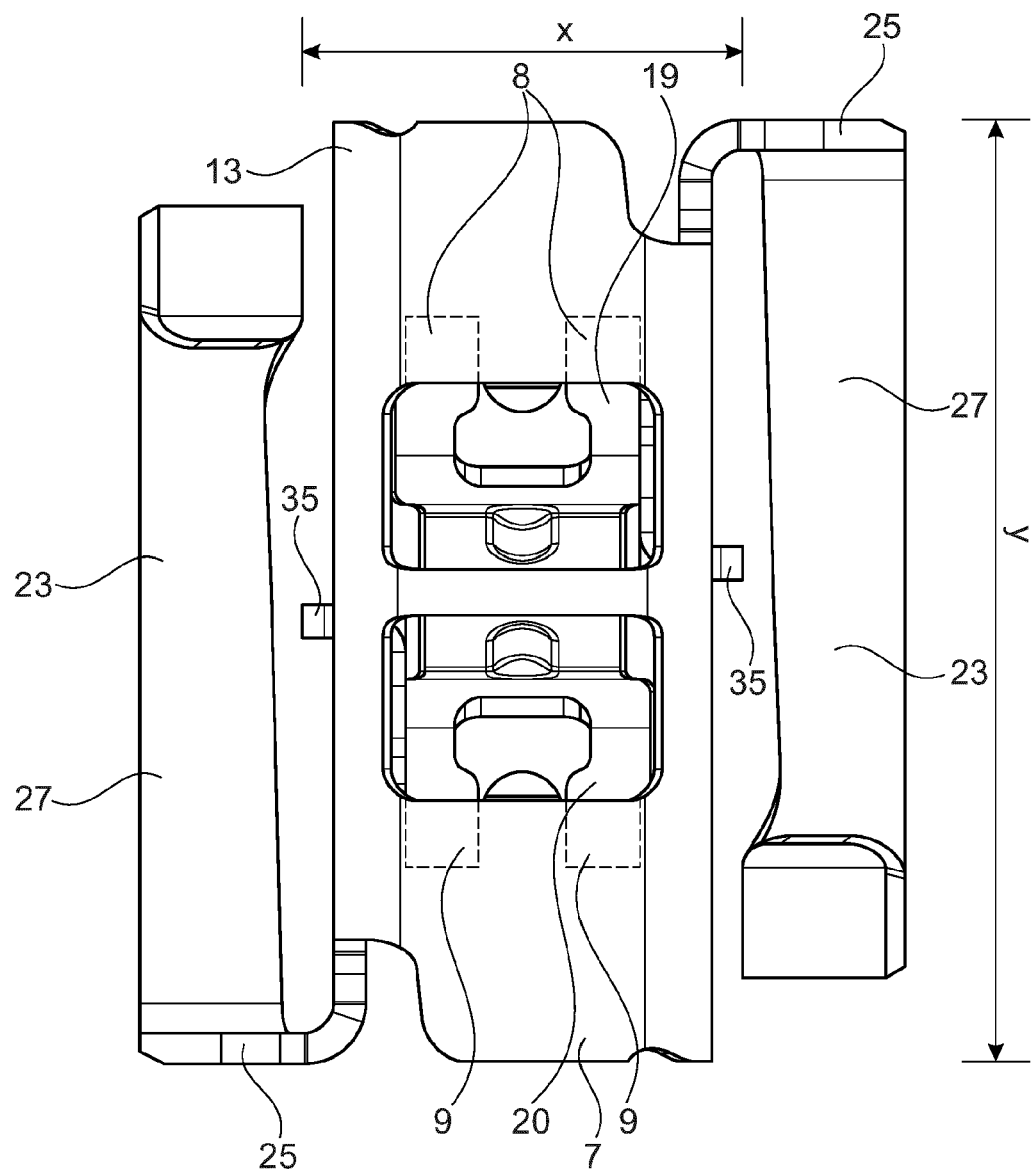
FIG. 3 shows a plan view along the longitudinal axis A from above of the clip according to FIGS. 1 and 2.

FIG. 3 shows a plan view of the clip according to the invention with the direction of view along the longitudinal axis A. Here, it can be seen that the head 1 in a direction perpendicular to the longitudinal axis A has a maximum longitudinal extension X in a direction perpendicular to the longitudinal axis A, which at the same time is perpendicular to the direction of the longitudinal axis X and has a maximum transverse extension Y, such that all parts of the head lie within a rectangular head boundary surface 21, which is perpendicular to the longitudinal axis. The longer side of the head boundary surface extends in the direction of the maximum longitudinal extension and has its length, and the shorter side of the head boundary surface extends in the direction of the maximum transverse extension Y and has its length. FIG. 3 shows the clip areas 8 and 9 with dashed lines. It can be seen that the projection of the clip surfaces 8, 9 in the direction of the longitudinal axis A lies on the plane of the head boundary surface in the head boundary surface. Thus, the clip surfaces 8 and 9 do not protrude beyond the space occupied by the head.

In addition, it can be seen in FIG. 3 that the directions of the longitudinal extensions X of the head 1 and the component of the direction of movement of the clip surface 8 perpendicular to the longitudinal axis A are parallel to each other.

FIGS. 1 and 2 show that the first side wall 10 extends from the first clip side 3 in the direction of the second clip side 4. Furthermore, the second counter wall 22 extends from the second clip side 4 in the direction of the first clip side 3. The first side wall 10 and the counter wall 22 each have flat base planes. As can be seen particularly well from FIG. 3, the plane in which the flat base planes of the first side wall 10 and the second counter wall 22 lie limits the extension of the clip transversely to the longitudinal axis A. All parts of the clip—with the exception of the resilient support arms described in more detail below—are located on one side of the plane containing the flat base planes of the first side 10 and the second counter wall 22.

The clip has a resilient support arm 23, which is connected to head 1 and projects sideways from it. In this case, in the exemplary embodiment in FIGS. 1, 2, and 3, the support arm 23 is arranged on the side of the first side wall 10. The side surface 11 of the side wall 10 merges into a bar 25 via a support arm bending section 24. The bar 25 merges into the resilient part 27 of the support arm 23 via a bar bending section 26. The resilient part 27 can be pressed in a resilient manner upwards around the bar bending section 26 and then exerts a downward reaction force on the element bending it upwards. A comparable support arm is provided on the opposite side of the head 1.

Figure 4:
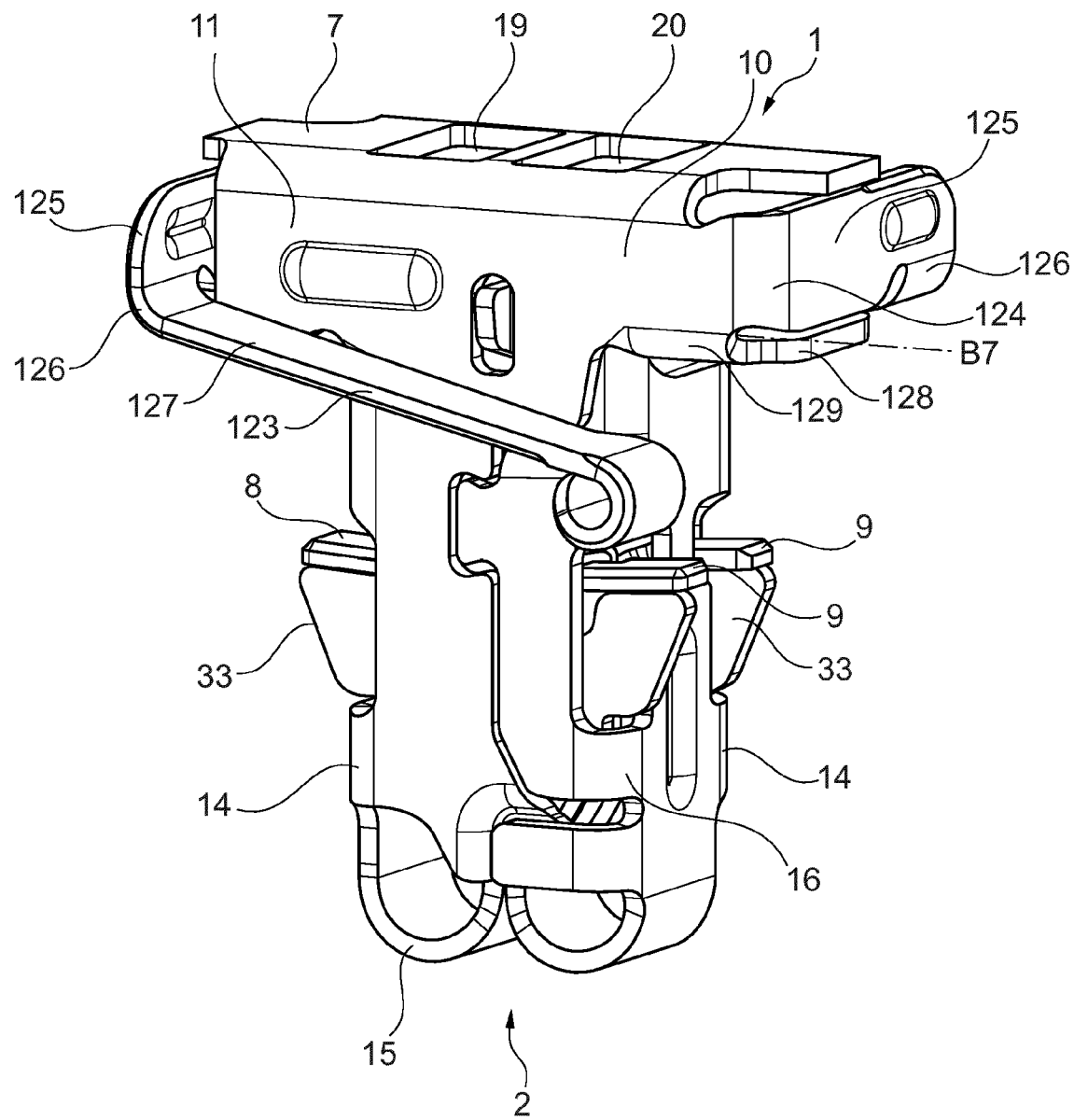
FIG. 4 shows a perspective side view obliquely from above of a modification of the clip according to FIGS. 1 to 3.
Figure 5:
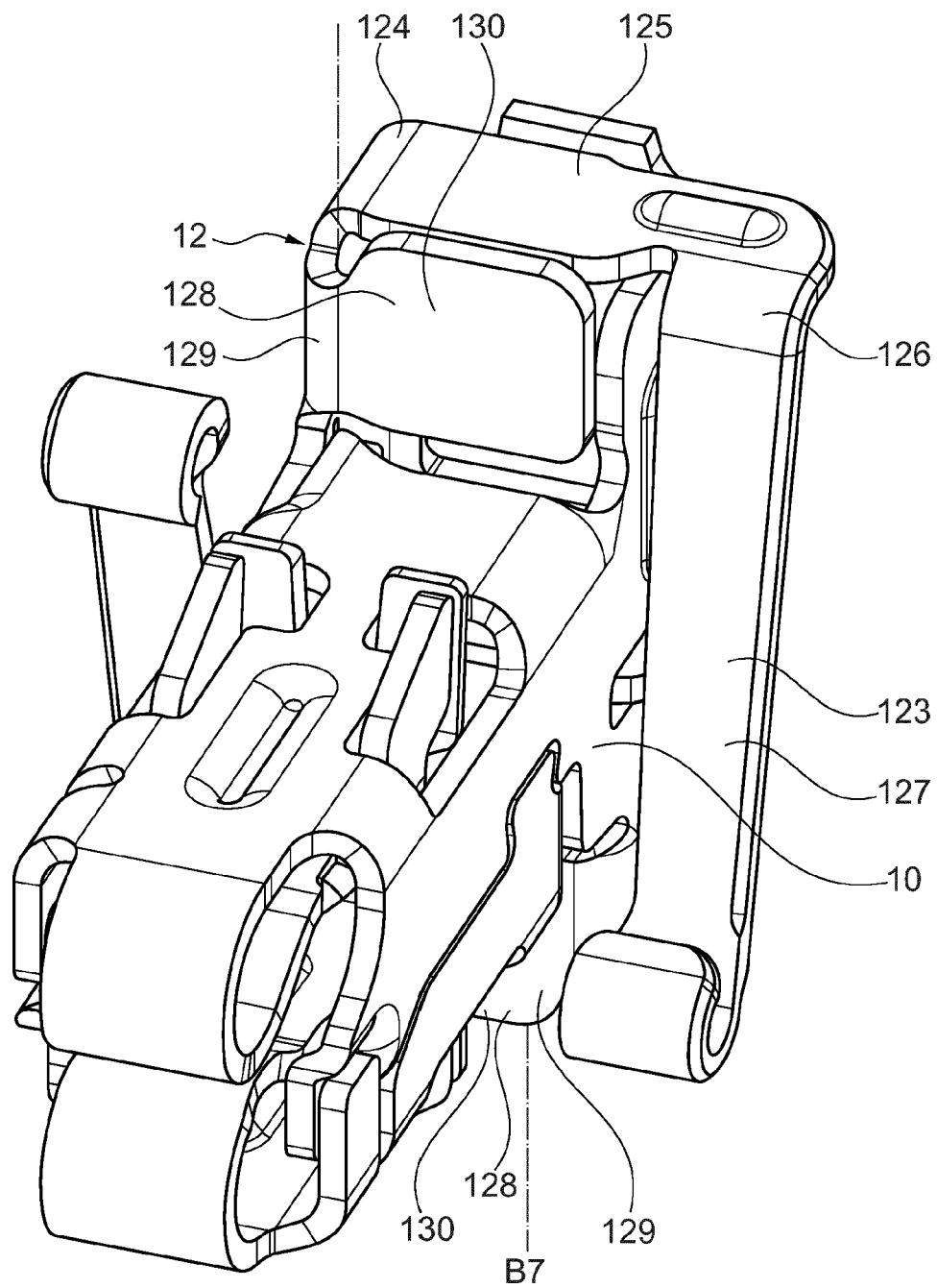
FIG. 5 shows a perspective side view obliquely from above of the clip according to FIG. 4.

FIGS. 4 and 5 show a modification of the clip shown in FIGS. 1 to 3. The modification is limited to the design of the support arms and the addition of a support section on the underside of the head 1. For this reason, the same reference signs are used for the elements of the clip that remain unchanged.

With the embodiment in FIGS. 4 and 5, the resilient support arm 123 is located on the side of the head opposite the first side wall 10. The resilient support arm 123 is connected to the first side wall 10 via a bar 125 connected to the first side wall 10. In this case, the first side wall 10 merges into the bar 125 via a support arm bending section 124. The bar 125 merges into the resilient part 127 of the resilient support arm 123 via a bar bending section 126.

In addition, the modified embodiment in FIGS. 4 and 5 has a support section 128. The first side wall 10 merges into the support section 128 via a seventh bending section 129, which is bent around a seventh bending axis B7. The seventh bending axis B7 is at an angle of 90° to the longitudinal axis A and runs parallel to the component of the direction of motion, which is perpendicular to the longitudinal axis A. A counter surface 130 facing the tip 2 is provided on the support section 128.

Figure 6:
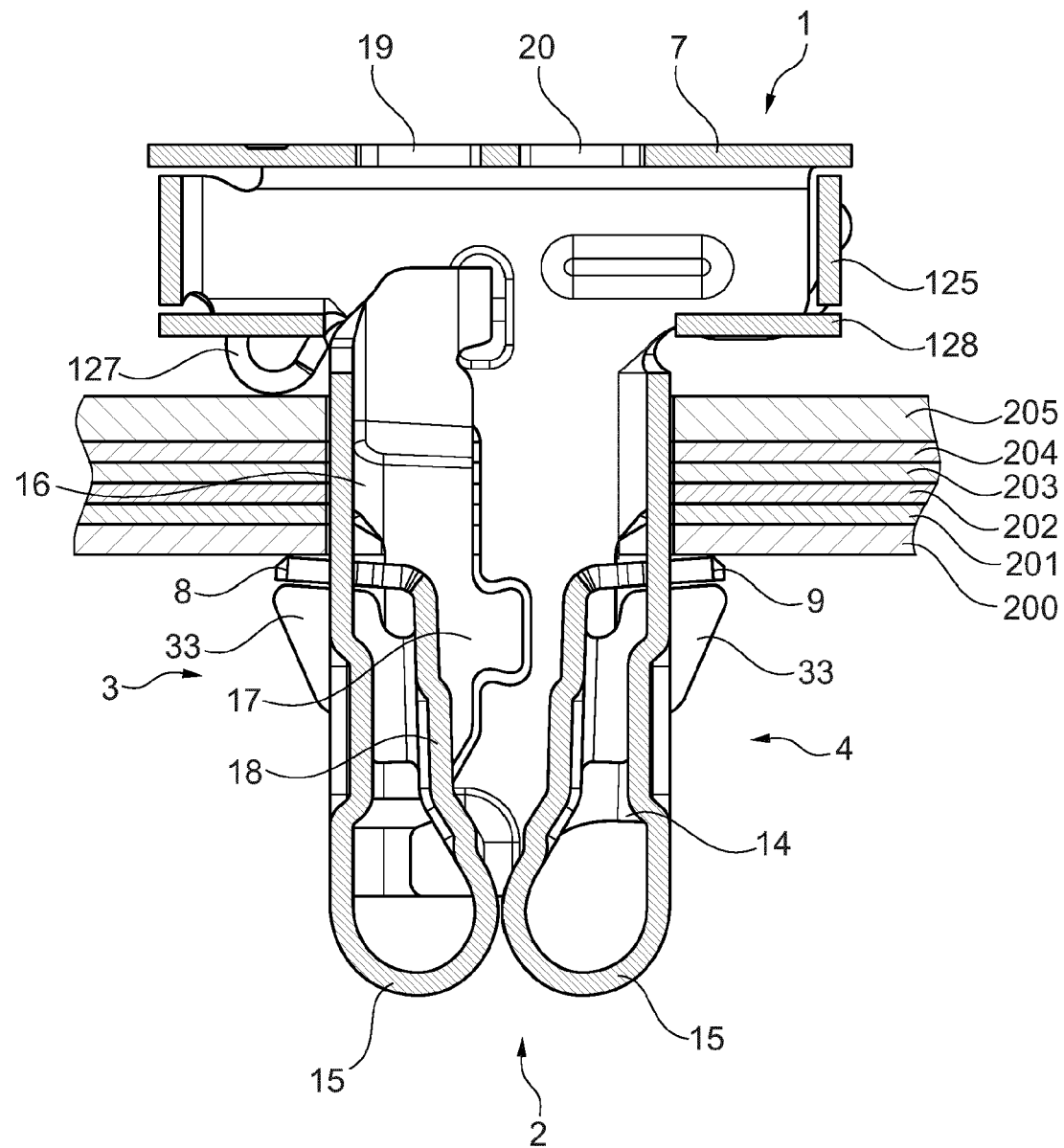
FIG. 6 shows a sectional side view of the clip according to FIG. 4 along with components that are attached to each other by the clip.

FIG. 6 shows how several components 200 to 205 can be attached to one another through the contact of the clip surfaces 8,9 on the one hand (from below) and the resilient part 127 of the support arm 123 on the other hand (from above). The components 200 to 205 each have a hole. The components 200 to 205 are placed on top of each other in such a manner that the holes are in alignment. Then, the clip is guided from above through the holes (starting with the hole in the component 205). In so doing, the part bearing the clip surfaces 8.9 initially springs back due to the bevels 33 such that the clip surfaces 8.9 are arranged closer to the longitudinal axis A. If the clip surface 8,9 has also passed the component 200, it springs back into the position shown in FIG. 6.

The clip shown in FIG. 1 is constructed rotationally symmetrical with respect to one axis of rotation, specifically the longitudinal axis A. The clip according to the invention in the embodiment shown in the figures is a one-piece element and was created by bending sections of a metal section. A first finger 28 bent backwards is provided on the second clip surface 4 and overlaps over an area 29 of the first side wall 10. For this purpose, the first side wall 10 has the more visible seat in the form of a dent 30 in FIG. 2. In this case, the first finger 28 is designed to be flush with the flat base body of the second counter wall 22.

As can be seen particularly well in FIGS. 1 and 2, the side wall 10 has a recess 31 in which a projection 32 of the second counter wall 22 engages. The projection 32 is designed in such a manner that it does not overlap with an area of the opposite side wall, but only engages in the recess 31 provided there.

In the exemplary embodiment shown in FIGS. 1 and 2, the first clip side 3 and the second clip side 4 each have a flat base body. In the figures, it can be seen that the otherwise flat base body has a small recess. This illustrates the understanding of the term "flat base body" used in the context of this description that a geometrically exact, flat base body is only provided in particular embodiments, but in other embodiments—as in this case—such base bodies are also designated "flat base bodies" which deviate from a geometrically exact flat shape due to small projections.

With the exemplary embodiment shown in the figure, the flat base body of the first clip side 3 is at an angle of 90 degrees to the flat base body of the first side wall 10. The flat base body of the second clip side 4 is at an angle of 90 degrees to the flat base body of the counter wall 22. The first side wall 10 and the second counter wall 22 are designed flush with each other (their outwardly pointing surfaces are located in a plane).

The respective clip surface 8, 9 is part of a flexible element that passes through a corresponding recess or window that is located in the respective transition between the clip side 4, 5 and the first side surface 10, the second side surface, the counter wall 17 and the second counter wall 22. The respective elastic element has a bevel 48 that causes the resilient element, if the clip is inserted into a hole in an element, to come into contact with the edge of the hole and is pressed inwards by the further insertion of the clip against the spring force but, after passing through the hole in the element, springs out again due to the spring force and thereby engages behind the corresponding element.

A hole 34 is provided in the side surface 11. Such hole 34 is penetrated by a pin 35 which is provided at the upper end of the counter wall 22 and runs at an angle of 90° to the counter wall 22.

FIGS. 1 to 3 and 4 to 5 show two designs of the clip according to the invention with resilient support arms 23, 123. However, this does not mean that the invention is only limited to designs with a resilient support arm. With other designs, the support arms 23, 123 are omitted and the head 1 comes into contact by the counter surfaces 5, 6 with one of the elements.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash"—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A clip for fastening a first element to a second element, the clip comprising:
    a head and a tip,
    a first clip side and a second clip side, wherein the first clip side extends from an area adjacent to the head along a longitudinal axis in the direction of the tip, and the second clip side extends from an area adjacent to the head along the longitudinal axis in the direction of the tip, and
    a clip surface protruding beyond the first clip side, wherein the clip surface can be moved, under the tension of a spring, from a first position along a direction of movement into a position located closer to the longitudinal axis in comparison to the first position, wherein the direction of movement has at least one component that is perpendicular to the longitudinal axis,
    wherein the head has a head section presenting a head surface pointing away from the tip, wherein the head surface merges into a first side wall via a first bending section which is bent around a first bending axis, wherein the first bending axis is at an angle of >0° to <180° to the longitudinal axis and/or at an angle of 0° to <90° to the component of the direction of movement of the clip surface that is perpendicular to the longitudinal axis, and
    wherein the first side wall merges into the first clip side via a second bending section which is bent around a second bending axis, wherein the second bending axis is at an angle of >0° to <180° to the component of the direction of movement of the clip surface that is perpendicular to the longitudinal axis and/or is at an angle of 0° to <90° to the longitudinal axis.

2. The clip according to claim 1, wherein the head has a counter surface facing the tip and is opposite the clip surface.

3. The clip according to claim 1, wherein the first clip side merges into a counter wall opposite the first side wall, via a third bending section which is bent around a third bending axis, wherein the third bending axis runs parallel to the second bending axis.

4. The clip according to claim 1, wherein the head has a maximum longitudinal extension in a direction perpendicular to the longitudinal axis and a maximum transverse extension in a direction perpendicular to the longitudinal axis which at the same time is perpendicular to the direction of the longitudinal extension, such that, in a plan view of the head along the longitudinal axis, all parts of the head lie within a rectangular head boundary surface which is perpendicular to the longitudinal axis, a longer side of which extends in the direction of the maximum longitudinal extension and has its length, and a shorter side of which extends in the direction of the maximum transverse extent and has its length, and the projection of the clip surface in the direction of the longitudinal axis is on the plane of the head boundary surface in the head boundary surface.

5. The clip according to claim 4, wherein the direction of the longitudinal extension of the head and the component of the direction of movement of the clip surface perpendicular to the longitudinal axis are parallel to each other.

6. The clip according claim 1, wherein the first side wall extends from the first clip side in the direction of the second clip side, and a second counter wall extends from the second clip side in the direction of the first clip side, and the first side wall and/or the second counter wall have a flat base plane that limits the extension of the clip transversely to the longitudinal axis.

7. The clip according to claim 1, wherein the first clip side merges into an intermediate section via a bending section, and the clip surface is arranged at the end of the intermediate section.

8. The clip according to claim 7, wherein a part of the bending section forms a part of the tip.

9. The clip according claim 1, wherein the first side wall merges into a support section via a seventh bending section which is bent around a seventh bending axis, wherein the seventh bending axis is at an angle of $>0°$ to $<180°$ to the longitudinal axis and/or is at an angle of $0°$ to $<90°$ to the component of the direction of movement of the clip surface that is perpendicular to the longitudinal axis, and a counter surface facing the tip is formed on the support section.

10. The clip according to claim 1, further comprising a resilient support arm connected to the head, wherein the resilient support arm is arranged on the side of the head opposite the first side wall, but is connected to the first side wall via a bar connected to the first side wall.

11. The clip according to claim 1, wherein the head, and the first clip side, and the first side wall, and the second clip side, and a second side wall are all part of a one-piece element created by bending sections of a metal section.

12. A device having a first element and a second element attached to the first element, wherein the first element has an opening, and the second element is attached to the first element via a clip according to claim 1, wherein the clip passes through the opening such that the head of the clip is arranged on one side of the first element, and the tip of the clip is arranged on the opposite side of the first element.

* * * * *